PHOTOCONDUCTIVE MEANS FOR DETECTING AREAS OF LOW-LEVEL ILLUMINATION

Original Filed May 20, 1964

INVENTOR
ROBERT J. BISSO
BY
Robert E. Strauser
ATTORNEY 3,340,427

PHOTOCONDUCTIVE MEANS FOR DETECTING AREAS OF LOW-LEVEL ILLUMINATION

Robert J. Bisso, Emporium, Pa., assignor to Sylvania Electric Products Inc., a corporation of Delaware Continuation of application Ser. No. 368,874, May 20, 1964. This application Dec. 28, 1964, Ser. No. 421,463
8 Claims. (Cl. 315—155)

ABSTRACT OF THE DISCLOSURE

A pair of normally conductive, series connected photoconductor cells are parallelly aligned relative to a direction of travel in a manner to provide a pair of out-of-phase D.C. pulses when sequentially interrupted by a dark spot moving in the direction of travel. Circuit means connecting the cells inverts one of the pulses to provide an A.C. signal output for subsequent amplification.

This invention generally relates to photoconductors and more particularly to photoconductors useful for detecting the presence of discrete areas of relatively low level reflected illumination within a specific zone of relatively higher level reflected illumination.

This application is a continuation of Ser. No. 368,874, filed May 20, 1964, and now abandoned, and assigned to the assignee of the present invention.

In currently available photoconductors of conventional design, a photosensitive material has deposited on it an interdigitated pattern of an electrically conductive substance. This pattern provides a continuous path of exposed photosensitive material. In operation, this device will become more or less conductive, depending upon the total amount of radiation falling on it. If this device were to be subjected to a discrete area of relatively low level illumination, any change in resistance would be negligible. For example, if a small spot were to intercept the radiation falling between any two of the interdigitated segments, it is doubtful if this would cause any measurable change in the resistance of the device. However, if the total amount of all radiation falling on the device were to vary, this device would respond with a corresponding change in resistance.

A device that would be capable of detecting discrete areas of relatively low level reflected illumination would be extremely useful in industry today.

Such a device is disclosed and claimed in the above-cited application and, briefly, consists of a photoconductor having an array of discontinuous paths of photosensitive material. A plurality of electrically conductive segments engage the paths and provide a series electrical circuit.

When this device is operating, it will conduct when all of the photosensitive paths are illuminated, and it will become relatively nonconductive when any one of these paths becomes subjected to a discrete area of relatively low level illumination.

This relative nonconductance, caused by the increased resistance of the darkened path, generates a single D.C. pulse which may be amplified by a pulse amplifier and then fed to associated equipment which will perform some predetermined control system function.

While this device is useful in many applications, it has several disadvantages when used with certain types of associated equipment; namely, the pulse circuits and amplifiers with which it is used are relatively expensive compared to those used with A.C. signals; and, also, the output waveforms of a pulse amplifier sometimes contain negative spikes which are undesirable.

It is, therefore, an object of this invention to provide a device capable of detecting discrete areas of relatively low level reflected illumination within a specific zone of relatively higher level reflected illumination and which may use relatively inexpensive circuitry.

Another object of the invention is to provide such a device that is reasonably economical to manufacture.

The above objects are carried out, in one aspect of the invention, by the provision of a device comprising a pair of laterally spaced apart photoconductors each having an array of discontinuous paths of photosensitive material. A plurality of electrically conductive segments engage the paths and provide series electrical circuits. The paths and segments on one of the photoconductors are substantially aligned with the paths and segments of the other photoconductor.

When this device is operating, the pair of photoconductors will conduct when all of the photosensitive paths are illuminated and each in turn will become relatively nonconductive when any of the photosensitive paths becomes subjected to a discrete area of relatively low level illumination passing between them and a source of illumination. By applying the proper electrical circuitry, this sequential nonconductance may be translated into two out-of-phase D.C. pulses which in turn may be converted to an A.C. signal. This A.C. signal may then be utilized with relatively inexpensive A.C. circuitry and amplifiers.

For purposes of this disclosure, a photosensitive material will be understood to mean a material whose inherent electrical resistance will vary according to the amount of radiation falling thereon; a photoconductor will be understood to mean a layer, block, or coating of photosensitive material having a particular configuration of electrically conductive material thereon; a device will mean two or more photoconductors associated in an operable manner; and by photoconductive cell will be meant a device together with any protective, encapsulating envelope and necessary leads for making electrical connections.

Also, where used in this specification, the phrase "smallest discrete area of relatively low level illumination the device will detect" will mean the smallest area the device will always detect, it being understood that, under the proper conditions, smaller areas may be detected.

For a better understanding of the present invention, together with other and further objects, advantages, and capabilities thereof, reference is made to the following disclosure and appended claims in connection with the accompanying drawings in which:

Figure 1:
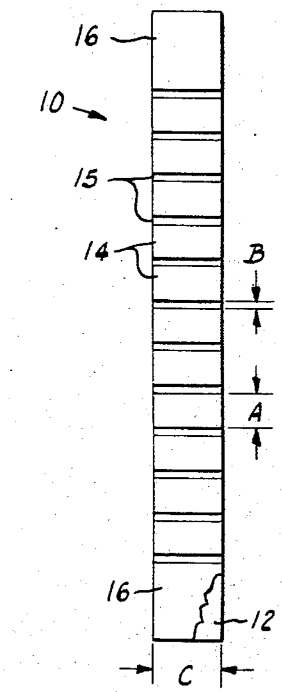
FIG. 1 is a plan view of a photoconductor utilized in the invention.

Referring now to the drawings with greater particularity, in FIG. 1 there is shown a photoconductor 10 comprised of an elongated bar of sintered photosensitive material 12 which may be cadmium sulfide or cadmium selenide or some similar photosensitive material. Disposed on an upper surface thereof is a serial array of spaced, electrically conductive segments 14 which provide a plurality of exposed, discontinuous photosensitive paths 15 electrically connected together by the segments. The two outermost ones of segments 14 are formed to provide connectors 16. The segments 14 and 16 may be aluminum or some similar material, and they may be applied by any well-known method. Segments 14 are all the same size while the two outermost ones 16 may be larger to facilitate electrical connection thereto. Segments 14 and paths 15 each have a given length, designated as A and B, respectively, when measured along the length of bar 12 and a given width designated as C. The ratio of these dimensions to one another determines the resistance of the device and also the smallest discrete area of relatively low level illumination the device will detect.

Since the device operates best when a photosensitive path 15 is completely blacked out, it will be seen that the variable B and C dimensions are important. As the resistance of the photosensitive material is a function of the exposed area, when the illumination is constant, it will be seen that the dimension CB determines the resistance of one path and, therefore, XCB determines the resistance of the device when X is the number of paths.

Since it is necessary that the segments 14 connecting the photosensitive paths have a given longitudinal dimension, A in this instance, it will be seen that should a discrete area of low level illumination having a maximum diameter less than A traverse the device entirely along one of the segments 14, the device would not respond because no area of photosensitive material would have been blacked out.

It becomes apparent from the above description that the dimensions of the paths and segments determine the minimum size of low level illumination the device will detect. The controlling factor in this determination will be dependent upon the ratio of the A, B, and C to one another. For example, when $C>A+2B$, then C is the controlling factor because it would be possible for an area of low level illumination having a maximum diameter less than C to cross the device without completely blacking out a photosensitive path. Likewise, when $C<A+2B$, then $A+2B$ would be the controlling factor because an area of low level illumination having a maximum diameter less than $A+2B$ could cross the device without completely blacking out a photosensitive path 15.

In operation, this device is utilized for the detection of flaws or imperfections in some raw material or manufactured product passing in front of it, as on a conveyor. The device is set up in a particular zone having a specific lighting supply free from adulterating illumination. Proper bias is applied to the device so that it would be normally conductive. When a discrete area of relatively low level illumination passes in front of the device in such a manner as to fall across one of the discontinuous photosensitive paths 15, then the device becomes relatively nonconductive. This relative nonconduction is caused by an increase in resistance which may be of the order of 1000 to 1 and provides a measurable signal which may be further amplified and then fed to associated equipment.

The measurable signal is derived in the following manner: As an area of low level illumination of minimum detectable size moves across one of the photosensitive paths 15, the resistance of the device increases. As the resistance increases, there is a corresponding increase in voltage. This continues until the entire path is blacked out at which time the maximum amplitude of the signal is reached. As the area of low level illumination begins to move beyond the device, the resistance and voltage decrease until, when the path is again completely illuminated, they have returned to normal.

Thus it will be apparent from the above description that the amplitude of the derived signal will be dependent upon the number of paths 15 blacked out by the area of low level illumination; i.e., the greater the number of paths blacked out, the greater the increase in resistance and corresponding increase in voltage. It will be apparent that the frequency of the signal will be dependent upon the speed with which the area of low level illumination passes the device.

The effective size of the controlling factor may be controlled by the use of optical enlarging or reducing lenses which make the finished device adaptable to many applications. For example, a device of this nature having a controlling factor equal to 1/16 of an inch coupled, when in operation, with a 2 to 1 reducing lens would have an effective controlling factor size of 1/32 of an inch. This device would then absolutely detect the presence of any discrete area of relatively low level illumination having a minimum dimension greater than 1/32 of an inch.

While the photosensitive material of this device has been described as being a bar or block of material, it is to be understood that a relatively thin coating could also be used, the choice being dependent upon the final application of the device and the design parameters specified. Where a high degree of accuracy is required in the resistance of the device, it will be more suitable to use the block material; and where the spectral responses are critical, the coating is the best choice.

Figure 2:
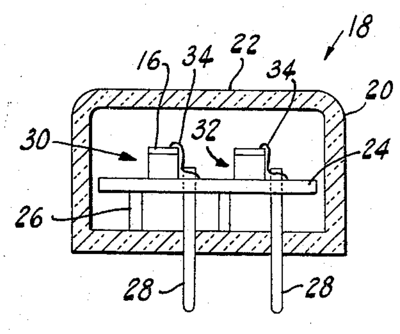
FIG. 2 is an elevational sectional view of a photoconductive cell utilizing the invention.

Having thus described the operation of a single photoconductor, attention is directed to FIG. 2 wherein is illustrated the device of the invention. The photoconductive cell 18 is comprised of an hermetically sealed envelope 20 encapsulating a substantially desiccated atmosphere, and it is constructed of some suitable material such as ceramic or glass and has at least one light transmitting surface 22. An electrically insulating support 24 is positioned interiorly of envelope 20 adjacent to and spaced from light transmitting surface 22. Support 24 is maintained in proper position by dummy leads 26 and by lead-in pins 28. The latter also serve to provide electrical connection to the cell.

First and second photoconductors 30 and 32, respectively, are positioned on support 24 and are held in place by any conventional means, such as cementing. Electrical connection may be made by conductive epoxy, indicated at 34, which is attached to segments 16 and pins 28 which project through support 24.

Figure 3:
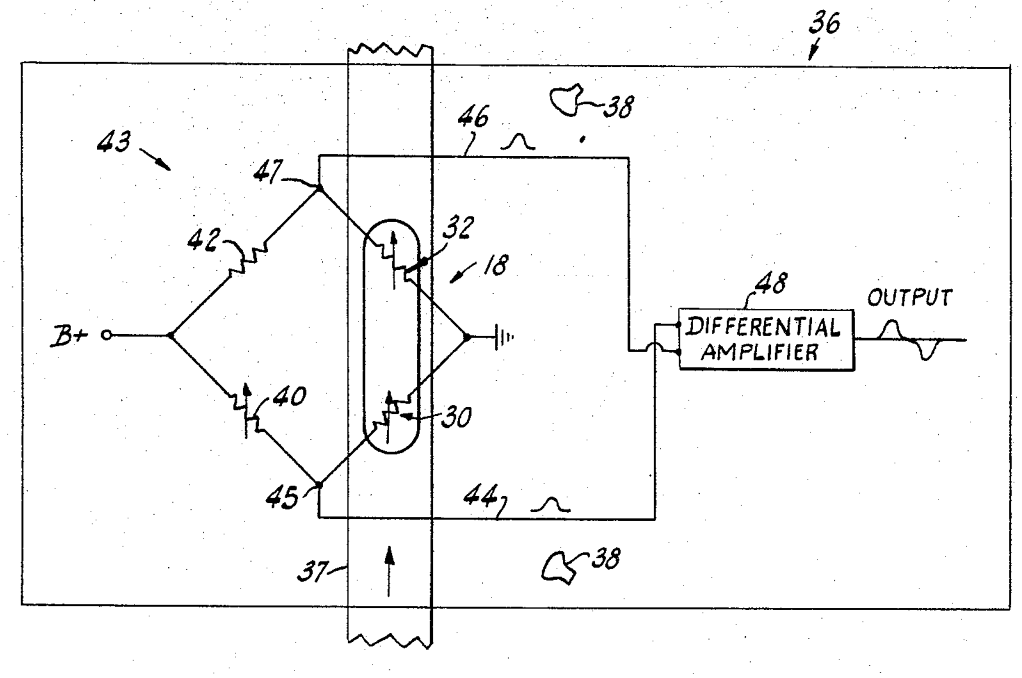
FIG. 3 is a schematic, diagrammatic view showing a simplified circuit illustrating one way in which the device may be employed.

In FIG. 3 is shown a diagrammatic, schematic view of a circuit in which this device may be used. A photoconductive cell 18 is positioned in a specific zone of relatively high level illumination, designated generally as 36, with the photosensitive paths facing conveyor 37 and with the longitudinal axis of the device transverse thereto. Illumination for the zone would be supplied by lamps 38. Photoconductors 30, 32 are connected at one end to ground and at the other end to B+ through resistors 40, 42, respectively, to provide a balanced bridge circuit 43. One of the resistors, in this instance 40, is preferably variable so that it may compensate for any unbalance that may exist between elements. A conductor 44 is connected to the bridge circuit between photoconductor 30 and resistor 40 at 45 and a similar conductor 46 is connected to the bridge circuit between photoconductor 32 and resistor 42 at 47. Conductors 44 and 46 terminate in a differential amplifier 48.

When resistor 40 is properly adjusted, the current through both halves of bridge circuit 43 will be equal and the voltage from point 45 to ground is equal to the voltage from point 47 to ground.

It will be seen that, in operation, when a discrete area of relatively low level illumination on conveyor 37 passes cell 18 (in the direction indicated by the arrow), it will first cross photoconductor 30 and if it blocks out one of the photosensitive paths, then it will cause an increase in resistance and a corresponding increase in voltage which will appear as a positive D.C. pulse between point 45 and ground with its amplitude and frequency determined as explained above. This pulse will be impressed on conductor 44 and will then be fed to differential amplifier 48. As the discrete area of relatively low level illumination then crosses photoconductor 32, another positive D.C. pulse will be generated, this time between point 47 and ground and it will be impressed upon conductor 46 and fed to differential amplifier 48. This second pulse will be the duplicate of the first in amplitude and frequency, but it is to be noted that the two pulses are out of phase with one another and that as they emerge as the output of differential amplifier 48, the second pulse has been inverted and the output is an A.C. signal.

This signal can then be readily amplified and then fed to associated equipment.

While this invention has been described with particularity as being used with reflected light, it will be apparent to those skilled in the art that this will be true only when the raw material or product being inspected and the conveyor on which it is carried are opaque. Should the product being inspected be transparent, then it would be best to utilize a transparent conveyor and mount the lamps 38 therebeneath in such a manner that the illumination emanating therefrom passes through the conveyor and product to the photoconductor device 10. In this instance device 10 will operate on transmitted illumination rather than reflected illumination.

This device provides an extremely useful function, not only as an inspection device, but in many other applications as well.

These rugged devices are reasonably economical to manufacture and provide a needed function which was not available heretofore.

While there have been shown and described what are at present considered the preferred embodiments of the invention, it will be obvious to those skilled in the art that various changes and modifications may be made therein without departing from the invention as defined by the appended claims.

What is claimed is:

1. A device for detecting the presence of discrete areas of relatively low level illumination from a specific zone of relatively higher level illumination comprising: a pair of laterally spaced apart photoconductors each having an array of spaced, discontinuous paths of photosensitive material and a plurality of electrically conductive segments engaging said paths to provide series electrical circuits terminating in outermost connectors, said electrically conductive segments between said outermost connectors on one of said photoconductors being electrically isolated from said electrically conductive segments on the other of said photoconductors; the paths and segments on one of said photoconductors being substantially aligned with the paths and segments of the other of said photoconductors; and a power supply and means for electrically connecting said power supply to said outermost connectors.

2. A device for detecting the presence of discrete areas of relatively low level illumination from a specific zone of relatively higher illumination comprising: first and second laterally spaced apart photoconductors having photosensitive material; a serial array of spaced, electrically conductive segments disposed on said material to provide said photoconductors with a plurality of exposed, discontinuous photosensitive paths electrically connected together by said segments; the paths and segments on said first photoconductors being substantially aligned with the paths and segments on said second photoconductors; the outermost ones of said segments on said photoconductors being formed to provide connectors, said electrically conductive segments, between said connectors on one of said photoconductors being electrically isolated from said electrically conductive segments on the other of said photoconductors; and a power supply and means for electrically connecting said power supply to said connectors.

3. A device for detecting the presence of discrete areas of relatively low level illumination from a specific zone of relatively higher level illumination comprising: first and second laterally spaced apart photoconductors, said photoconductors each having a plurality of alternating photosensitive paths and electrically conductive segments, there being one more segment than paths and the outermost ones of said segments being formed to provide connectors, said electrically conductive segments between said connectors on one of said photoconductors being electrically isolated from said electrically conductive segments on the other of said photoconductors; the paths and segments on said first photoconductor being substantially aligned with the paths and segments on said second photoconductor; and a power supply and means for electrically connecting said power supply to said connectors.

4. A device for detecting the presence of discrete areas of relatively low level illumination from a specific zone of relatively higher level illumination comprising: first and second laterally spaced apart photoconductors each having an array of discontinuous paths of photosensitive material and a plurality of electrically conductive segments engaging said paths to provide series electrical circuits terminating in outermost connectors, said electrically conductive segments between said outermost connectors on one of said photoconductors being electrically isolated from said electrically conductive segments on the other of said photoconductors.

5. A device for detecting the presence of discrete areas of relatively low level illumination from a specific zone of relatively higher level illumination comprising: first and second laterally spaced apart photoconductors each having an array of discontinuous paths of photosensitive material and a plurality of electrically conductive segments engaging said paths to provide series electrical circuits terminating in outermost connectors, said electrically conductive segments between said outermost connectors on one of said photoconductors being electrically isolated from said electrically conductive segments on the other of said photoconductors; said paths and segments of said first photoconductor being substantially aligned with said paths and segments of said second photoconductor.

6. A device for detecting the presence of discrete areas of relatively low level illumination from a specific zone of relatively higher level illumination comprising: first and second laterally spaced apart photoconductors each having a serial array of discontinuous paths of photosensitive material and a plurality of electrical conductive segments engaging said paths to provide series electrical circuits terminating in outermost connectors, said electrically conductive segments between said outermost connectors on one of said photoconductors being electrically isolated from said electrically conductive segments on the other of said photoconductors, said paths and said segments on each of said photoconductors providing a controlling factor having an effective size equal to or less than the minimum dimension of said discrete area of relatively low level illumination to be detected; the paths and segments on said first photoconductor being substantially aligned with the paths and segments on said second photoconductor; and a power supply and means for electrically connecting said power supply to said connectors.

7. A device for detecting the presence of discrete areas of relatively low level illumination from a specific zone of relatively higher level illumination comprising: first and second laterally spaced apart photoconductors each having a serial array of discontinuous paths of photosensitive material and a plurality of electrical conductive segments engaging said paths to provide series electrical circuits terminating in outermost connectors, said electrically conductive segments between said outermost connectors on one of said photoconductors being electrically isolated from said electrically conductive segments on the other of said photoconductors, said paths and said segments on each of said photoconductors providing a controlling factor having an effective size equal to or less than the minimum dimension of said discrete area of relatively low level illumination to be detected; the paths and segments on said first photoconductor being substantially aligned with the paths and segments on said second photoconductor.

8. Apparatus for sensing the presence of discrete areas of relatively low level illumination from a specific zone of relatively higher level illumination comprising a combination a device for detecting said areas of low level illumination and circuit means cooperative therewith for generating a pair of out-of-phase D.C. pulses and converting said pulses into an A.C. output signal, said device comprising: first and second laterally spaced apart photoconductors having photosensitive material; a serial array of spaced, electrically conductive segments disposed on said material to provide said photoconductors with a plurality of exposed, discontinuous photosensitive paths electrically connected together by said segments, the outermost ones of said segments on said photoconductors being formed to provide connectors, said electrically conductive segments between said connectors on one of said photoconductors being electrically isolated from said electrically conductive segments on the other of said photoconductors; the paths and segments on said first photoconductor being substantially aligned with the paths and said segments on said second photoconductor; and said circuit means comprising a power supply; a substantially balanced bridge circuit having said first and second photoconductors respectively in adjacent arms of said bridge circuit; and a differential amplifier connected across said bridge circuit for inverting one of said D.C. pulses to form said A.C. output signal.

References Cited

UNITED STATES PATENTS

| | | | |
|---|---|---|---|
| 2,831,634 | 4/1958 | Luhn | 235—61.11 |
| 2,908,594 | 10/1959 | Briggs | 338—19 X |
| 3,202,827 | 8/1965 | Robinson | 250—211 X |
| 3,254,201 | 5/1966 | Miller | 235—61.11 X |

FOREIGN PATENTS

| | | |
|---|---|---|
| 210,604 | 2/1924 | Great Britain. |

JAMES W. LAWRENCE, *Primary Examiner.*

P. C. DEMEO, *Assistant Examiner.*